United States Patent
Webb

(10) Patent No.: US 6,508,965 B1
(45) Date of Patent: Jan. 21, 2003

(54) PROCESS AND APPARATUS FOR THE PRODUCTION OF PAPER PRODUCTS

(75) Inventor: Donald B. Webb, Tallai (AU)

(73) Assignee: Fibrecycle Pty Ltd., Tallai (AU)

( * ) Notice: Subject to any disclaimer, the term of this patent is extended or adjusted under 35 U.S.C. 154(b) by 0 days.

(21) Appl. No.: 09/406,081

(22) Filed: Sep. 27, 1999

Related U.S. Application Data

(63) Continuation of application No. PCT/AU98/00206, filed on Mar. 25, 1998.

(30) Foreign Application Priority Data

Mar. 27, 1997 (AU) .............................................. PO5919

(51) Int. Cl.⁷ ................................................. B31F 7/00
(52) U.S. Cl. ........................ 264/118; 264/140; 366/85; 366/318; 425/206; 425/209; 425/363; 162/903
(58) Field of Search ................................ 264/109, 118, 264/122, 140; 425/204, 206, 209, 363; 198/819; 162/903; 366/314, 318, 325.1, 85

(56) References Cited

U.S. PATENT DOCUMENTS

| | | | |
|---|---|---|---|
| 1,288,025 A | * 12/1918 | Kennedy | |
| 2,796,810 A | 6/1957 | Müller | ........................... 92/39 |
| 4,619,381 A | * 10/1986 | Wurtz | ........................... 366/85 |
| 4,778,046 A | * 10/1988 | Hashimoto et al. | ......... 198/819 |
| 5,614,227 A | * 3/1997 | Yarbrough | ................... 425/204 |
| 5,725,783 A | * 3/1998 | Hoden | |

FOREIGN PATENT DOCUMENTS

| | | | |
|---|---|---|---|
| WO | WO 92/01833 | * | 2/1992 |
| WO | WO 94/19539 A1 | | 9/1994 |

\* cited by examiner

*Primary Examiner*—Mathieu D. Vargot
(74) *Attorney, Agent, or Firm*—Howrey Simon Arnold & White, LLP

(57) ABSTRACT

A process and an apparatus for the production of paper products, such as "cat litter" or paper fuel, comprising reducing paper to a particulate form by shredding and grinding, conveying the particles of paper from a hopper as a layer on a first conveyor firstly beneath a leveling and compacting roller and thereafter beneath a set of water sprayers, before discharging from the conveyor onto a second conveyor with the assistance of a rearwardly baffle plate to invert the layer during transfer. The inverted layer on the second conveyor passes to a third conveyor belt which moves through a ring with has the effect of wrapping the belt over itself and around the mix to form a tunnel enveloping and compacting the mix to form an extrusion. The paper product as extruded is cut into pellets before subjecting the pellets to dehydration. In the case of paper product to be used as paper fuel, the paper is mixed with coal dust. The bottom of the hopper contains a plurality of rotatable worm screws for discharging the paper evenly across the conveyor while rotatable paddle agitators are also contained in the bottom of the conveyor to prevent the particulate paper from agglomerating into lumps.

13 Claims, 2 Drawing Sheets

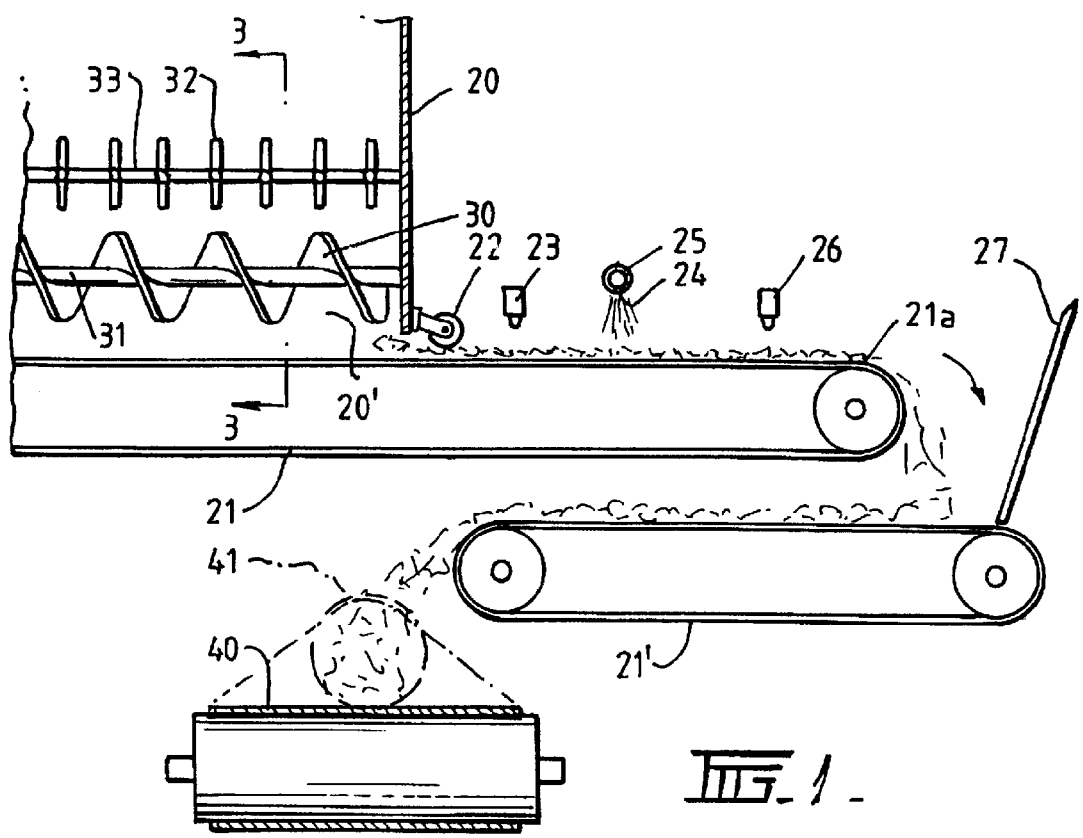
FIG. 1.
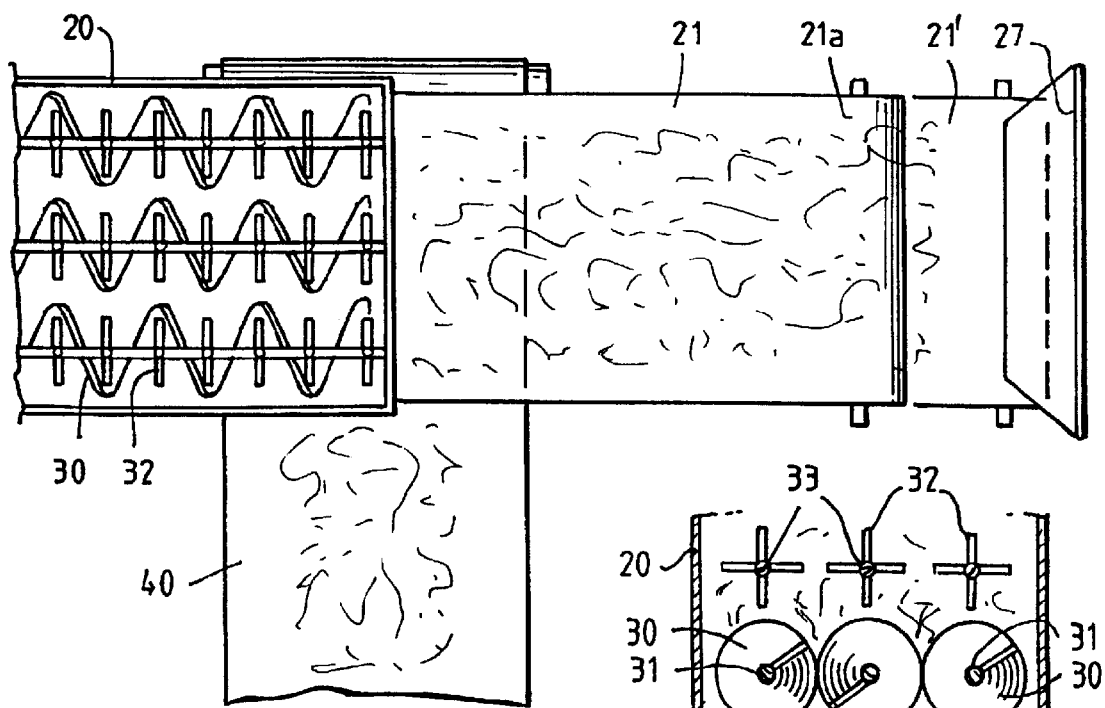
FIG. 2.
FIG. 3.

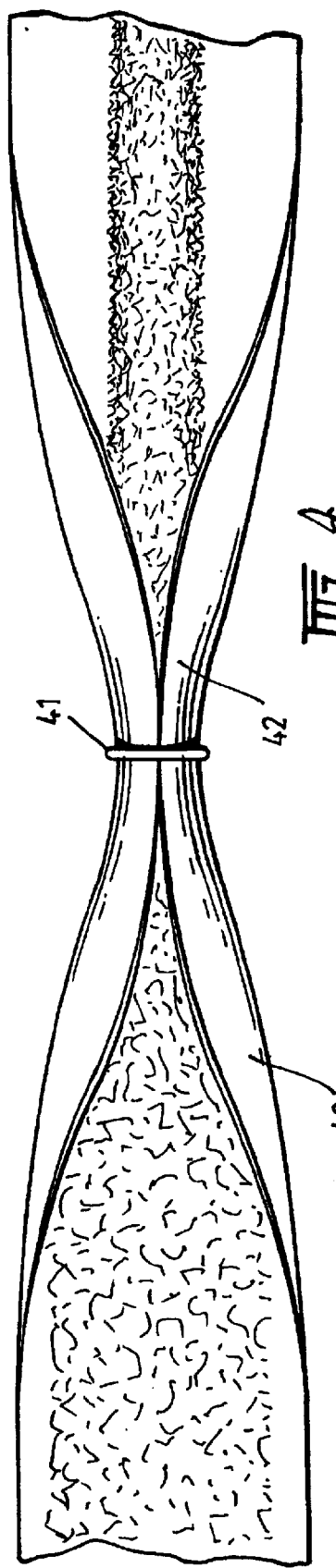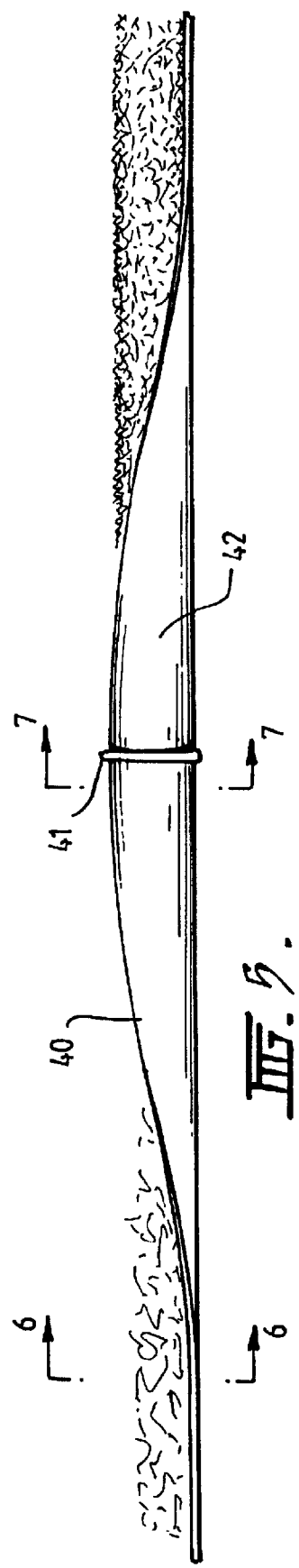

PROCESS AND APPARATUS FOR THE PRODUCTION OF PAPER PRODUCTS

This application is a continuation of international application number PCT/AU98/00206 filed Mar. 25, 1998, which is a continuation of Australian Application No. PO5919 filed Mar. 27, 1997.

TECHNICAL FIELD

This invention relates to a process and apparatus for the production of paper products, such as moisture absorbing products or a combustible paper fuel.

In the case of a moisture absorbing product, such may be capable of absorbing liquids without losing its shape, and in particular, but not exclusively, such a product in a pelletised form. One embodiment of the invention has been particularly developed for use as "cat litter", although it may be used for other purposes where its moisture absorbing properties are required.

BACKGROUND ART

The major products presently available for use as "cat litter" or for other moisture (liquid) absorbing purposes, are formed from clay based materials and are non-organic with the resulting problem that they will not decompose. In addition they have the added disadvantage of depositing clay powder on the paws of cats which is subsequently transferred to floor surfaces leaving tracks. In addition such products result in the continued use of mineral resources whilst more recently certain cultivated pasture crops have been unnecessarily harvested and used merely for the purposes of "cat litter".

In the case of paper fuel it may be composed of a relatively high percentage of paper. Whilst paper combusts readily it cannot be used in its basic form as it either burns too quickly in its loose sheet form or will not burn satisfactory when in the form of a thick mass. In addition, it is important to consider the physical transportation of recyclable paper in its normal form from collection zones to points of use for heating and/or cooking.

As a result of a heightening of community awareness, the supply of paper for recycling has increased to such a degree that it, in many cases, far exceeds the demand for conventional products made from such recycled paper, and as a result the excess is disposed of by landfilling or exported usually at the cost of the country.

In international patent application no. PCT/AU91/00308 (Publication no. WO92/01833) there is disclosed a process and an apparatus for the production of paper products, such as "cat litter" or paper fuel, comprising reducing paper to a particulate form by shredding and grinding, conveying the particles of paper as a layer on a first conveyor firstly beneath a first levelling and compacting roller and thereafter beneath a first set of water sprays, before discharging from the conveyor onto a second conveyor through a rearwardly inclined transfer chute to invert the layer during transfer. The inverted layer on the second conveyor passes firstly beneath a second levelling and compacting roller and thereafter beneath a second set of water sprays. The paper product is completed by extruding the paper and water mixture and cutting the extruded mix into pellets before subjecting the pellets to dehydration. In the case of paper product to be used as paper fuel, the paper is mixed with coal dust.

The process and apparatus referred to above has proved effective for the production of paper products, but some difficulties have been encountered in firstly controlling the discharge of the shredded and ground particulate paper from a supply bin or hopper onto the first conveyor, and secondly in forming at the end of the process a suitably compacted or compressed paper and water mixture for extrusion and subsequent cutting into pellets.

DISCLOSURE OF THE INVENTION

It is therefore an object of a first aspect of the present invention to provide a process and apparatus for controlling the discharge of shredded and ground particulate paper from a bin or hopper onto a conveyor.

It is also an object of a second aspect of the present invention to provide a process and apparatus for compacting or compressing a paper and water mixture on a conveyor for extrusion and subsequent cutting into pellets.

According to the first aspect of the invention there is envisaged a process for producing a paper product, including the steps of reducing paper to particulate form, mixing the particles of paper with water, subjecting the mix to pressure on a conveyor to form a compacted mass layer which is subsequently subjected to dehydration to reduce the moisture content, before or after the cutting thereof into pellets, wherein the paper in particulate form is discharged from a bin or hopper onto the conveyor on which it is to be mixed with water, and wherein the paper in particulate form while being discharged is subjected to both agitation and even distribution across the width of the conveyor.

The first aspect of the present invention also envisages an apparatus for carrying out the process defined above.

According to the second aspect of the invention there is envisaged a process for producing a paper product, including the steps of reducing paper to particulate form, mixing the particles of paper with water, subjecting the mix to pressure to form a compacted mass which is subsequently subjected to dehydration to reduce the moisture content, wherein the subjection of the mix to pressure to form a compacted mass is, or includes, wrapping a conveyor laterally over itself and around the mix to envelope and compact the mix prior to dehydration.

The second aspect of the invention also envisages an apparatus for carrying out the process defined above.

The invention still further envisages a paper product resulting from the process and apparatus of the first and second aspects of the invention defined above.

BRIEF DESCRIPTION OF THE DRAWINGS

In one embodiment of the first and second aspects of the invention the process and apparatus produces a paper product for use as a moisture absorbing medium.

In another embodiment the process and apparatus produces a combustible fuel formed primarily from particles of compressed paper combined at least with coal dust.

Preferably, in the case of a combustible fuel, a proportion of calcium oxide is also added to the mix.

One preferred embodiment of the process and apparatus of the invention will now be described with reference to the accompanying drawings, in which;

FIG. 1 is a side elevational view of part of an apparatus for carrying out the process of the first and second aspects of the invention, FIG. 2 is a plan view of the part of the apparatus of FIG. 1, FIG. 3 is a cross-sectional view taken along line 3—3 of FIG. 1, FIG. 4 is a schematic plan view of the configuration of one of the conveyors during the process, and in accordance with the preferred embodiment of the second aspect of the invention, FIG. 5 is a schematic side elevational view of the configuration of FIG. 4, FIG. 6 is a cross-sectional view taken along line 6—6 of FIG. 5, and FIG. 7 is a cross-sectional view taken along line 7—7 of FIG. 5.

BEST MODE FOR CARRYING OUT THE INVENTION

In this preferred embodiment of the first and second aspects of the invention, as applied to producing a moisture absorbing product, and as disclosed in the aforementioned International patent application, the recycled paper used is primarily newsprint which is ground in available paper grinding equipment down to a paper fluff suitable for subsequent compression and binding. Water is then added to the paper fluff to achieve an overall water content of between 25–30%.

The mixture of paper and water is then extruded under high pressure, thought to be in excess of 2,000 MPa, and then divided into moisture absorbing pellets having a surface area of between 110 mm$^2$ and 210 mm$^2$ and a length of between 5 mm and 15 mm.

The pellets are then finally dehydrated by a drying process to reduce their moisture content to something less than 10%.

The resultant pellets are capable of absorbing in excess of twice their own weight of water without substantially changing their shape and are also substantially free of paper dust. After use, for example as "cat litter", the pellets can be readily disposed of by digging into soil as an organic, decomposable, non-toxic soil conditioner, or flushed into sewerage systems.

Other suitable uses of the pellets is as water retention masses and soil conditioners to aid the cultivation of plants.

As applied to paper fuel the particle size produced from the grinding operation should be such as to range from paper fluff to particles having a surface area up to 5 cm$^2$ whilst the fluff should not be less than 30% of the total paper mix.

The ground paper is then mixed with coal dust, calcium oxide and water. The coal dust can be a by-product of the manufacturer of briquettes, and may range in particle size up to 1.5 mm in diameter and blended with the ground paper in the ratio between 2:1 and 4:1 paper to coal dust. The calcium oxide component should be 1 part per 100 of the paper and coal mix and sufficient water added to result in a moisture content for the mix of between 25 to 30%.

The above mixture is then extruded under high pressure, thought to be in excess of 2,000 MPa, and divided into units of fuel having a surface area between 60 cm$^2$ and 100 cm$^2$, with a length between 3 cm and 6 cm and a mass in excess of 1.00 gms per cm$^3$ of dry weight.

The extruded units are then finally dehydrated by a drying process to reduce the moisture content of the units for something less than 13.5%.

The resultant combustible fuel is in effect clean, readily packaged units suitable for domestic, commercial and/or industrial purposes, such as for heating, and the blend of the mixture and the degree of compression is such as to have an overall energy value of 15 MJ/kg.

In accordance with this preferred embodiment of the first and second aspects of the present invention, the process as applied to the production of a moisture absorbing paper product, or a predominantly paper based combustible fuel, involves taking raw material (waste paper) from a storage, passing it through a preliminary sizing process to reduce (shred) the waste paper to a manageable size for subsequent grinding in a grinding plant to paper fluff. The paper fluff is subsequently aspirated, whereafter the fluff is settled and subsequently conditioned by application of water. The conditioned paper product is then transferred to extruding equipment where it is extruded in a pellet mill into a continuous length and cut to individual pellet lengths, before being dryed in a dryer. The process is completed by a sizing operation to remove undersized and oversized pellets (including dust particles), for subsequent transfer to a finished product dispatch station.

FIGS. 1, 2 and 3 of the drawings show the part of the apparatus for carrying out the aspiration, settling and conditioning steps of the process, and comprises a storage bin or hopper 20 from which ground paper gravitates as a layer onto the upper run of a first stage conveyor belt 21 driven to run at a speed of in the order of 1 meter per second and then beneath a first pivoted leveling and pressurising roller 22 which serves to compact the layer of ground paper on the conveyor belt 21 to a thickness of between 10 to 20 mm. Because of the pivoted support for the leveling and pressurising roller 22, it is free floating to ride over larger objects or masses of material. The compacted paper fluff is then passed on the conveyor belt 21 beneath a first flow sensor 23, in the form of a micro-switch, which confirms that there is a layer of material on the conveyor belt 21.

The material on the first stage conveyor belt 21 then passes beneath a first set of spraying jets 24, supplied with water through a supply conduit 25, and only operable if the first flow sensor 23 has detected the presence of material on the conveyor. The moistened (conditioned) material on the conveyor belt then moves beneath a second flow sensor 26 which confirms that there is still a layer of material on the conveyor belt 21, and then gravitates over the discharge end 21a of the conveyor belt 21 and against a baffle plate 27 onto the trailing end of a second stage conveyor belt 21' the upper run of which is travelling in the opposite direction to the upper run of the first stage conveyor belt (contrary to what is disclosed in the aforementioned International patent application), and in the process the material is also inverted to expose the opposite side of the material to firstly what may be a second free floating pivoted leveling and pressurising roller (not shown) and thereafter what may be a second set of spraying jets (also not shown), and also supplied with water through a supply conduit, and the aspirated, settled and conditioned mass of paper fluff is then transferred to the extruder where it is extruded and cut to the required pellet size, before drying and sizing.

In the case of paper fuel, the ground paper, before being supplied to the storage bin or hopper 20, is mixed with a proportion of coal dust and a proportion of calcium oxide, and the mixture is thereafter subjected to aspiration, settling and conditioning in the apparatus shown in FIGS. 1, 2 and 3.

Modulator valves (not shown) control the volume of water sprayed onto the material by the spraying jets 24 above both the first stage conveyor belt 21 and also possibly above the second stage conveyor belt 21', and the volume of the sprays is controlled to be dependent on the speed of the respective conveyor belts.

The conveyor belts 21 and 21' may have a plurality of spaced apart cleats (not shown) extending transversely of their length which serve to not only assist in conveying the material, but also to control the thickness of material between the preferred limits of 10 to 20 mm.

In relation particularly to a moisture-absorbing paper product, the process of this preferred embodiment of the invention can achieve bulk densities of product up to 660 kg/m$^3$ with a relatively slow throughput, and less friable for use as a "cat litter" for example, whilst in relation to a low density product capable of rapidly absorbing floor spills, such as oils, bulk density of between 300 to 500 kg/m$^3$ are desirable.

In accordance with preferred embodiment of the first aspect of the present invention, the bottom of bin or hopper 20 at the discharge opening 20' therefrom has means to control the discharge of shredded and ground paper therefrom onto the conveyor 21 to provide, what may be known as a "live" bottom device and consisting of a plurality (in this case three) worm screws 30 mounted for rotation on shafts 31 to continuously move the paper rearwardly of the bin relative to the forward motion of the upper run of the conveyor 21 and ensure even discharge of the paper through the discharge opening 20' and onto the upper run of the conveyor 21, whilst above the respective worm screws there are once again three paddle type agitators 32 mounted for rotation on shafts 33 which agitate the particulate paper to prevent it from agglomerating into lumps of paper which would adversely effect its controlled discharge and the laying of an even thickness of the paper mat on the conveyor 21. With such a "live" device in the bottom of the bin or hopper 20, effective constant and even control of the flow and rate of discharge of the dry form of the particulate paper is achieved, whereby the discharge is even laterally across the surface of the conveyor 21 whilst preventing the accumulation of paper at the front end of the bin or hopper 21 which would interfere with the even discharge therefrom. The effect of both the worm screws 30 and the agitators 32 is to increase the density of the paper mat; enhance the matting effect; and increase throughput of paper without having to increase conveyor size and/or its conveying speed.

In accordance with the preferred embodiment of the second aspect of the present invention, with particular reference to FIGS. 4 to 7 of the drawings, the discharge end of the second stage conveyor belt 21' discharges the paper and water mix onto the trailing upper end of a third stage conveyor belt 40 extending at right angles to the discharge end of the second stage conveyor 21' and which conveys the mix through a ring 41 or other apparatus which has the effect of laterally curling or wrapping the conveyor belt 40 over itself and around the mix by up to 540° to form a tunnel 42 enveloping and compacting the mix whereby it exits from the ring in the form of a cylindrical extruded paper and water mix which may be subjected to dehydration before or after being cut into pellets, and which may involve additional extrusion through an extruding device prior to dehydration.

It is perceived that the compaction (compression) of the paper mix within the third stage conveyor will control the surface adhesion of the paper within the mix; and maximise the mass and density of the mix up to four times; whilst allowing ease of introduction of additives into the mix during the compaction (compression) thereof.

What is claimed is:

1. A process for producing a paper product, including the steps of reducing paper to particulate form, mixing the particles of paper with water, subjecting the mix to pressure on a conveyor to form a compacted mass layer which is subsequently subjected to dehydration to reduce the moisture content, before or after the cutting thereof into pellets, wherein the paper in particulate form is discharged from a bin or hopper onto the conveyor on which it is to be mixed with water, and wherein the paper in particulate form is discharged whilst being subjected to both agitation and even distribution across the width of the conveyor.

2. A process for producing a paper product, comprising:
   obtaining particulate paper;
   discharging the particulate paper from a bin or hopper onto a conveyor so that the particulate paper is agitated and distributed across the conveyor;
   mixing the particulate paper with water;
   subjecting the mix to pressure on a conveyor to form a compacted mass layer;
   dehydrating the compacted mass layer; and
   cutting the compacted mass layer into pellets, either before or after the dehydration step.

3. The process of claim 2, wherein the particulate paper is subjected to agitation by a plurality of rotatable paddle agitators during discharge.

4. The process of claim 3, wherein axes of rotation of the agitators extend in the direction of movement of the conveyor onto which the particulate paper is discharged.

5. The process of claim 2, wherein the particulate paper is subjected to distribution across the conveyor by rotatable worm screws.

6. The process of claim 5, wherein axes of rotation of the worm screws extend in the direction of movement of the conveyor onto which the particulate paper is discharged.

7. The process of claim 2, wherein the particulate paper is subjected to agitation by a plurality of rotatable paddle agitators during discharge, the particulate paper is subjected to distribution across the conveyor by rotatable worm screws, and axes of rotation of the agitators and the worm screws extend in the direction of movement of the conveyor onto which the paper is discharged.

8. The process of claim 2, further comprising discharging the compacted mass layer from a first conveyor onto a second conveyor in a manner involving inversion of the layer.

9. The process of claim 2, wherein subjecting the mix to pressure to form a compacted mass is accomplished by a process that comprises wrapping a conveyor laterally over itself and around the mix to envelope and compact the mix.

10. An apparatus for producing a paper product, comprising:
    a bin or hopper for particulate paper;
    a conveyor onto which the particulate paper is discharged from said bin or hopper;
    at least one agitator to agitate the particulate paper during discharge from said bin or hopper; and
    at least one distributor to distribute the particulate paper across the conveyor during discharge from said bin or hopper.

11. The apparatus of claim 10, wherein the at least one agitator comprises a plurality of rotatable paddle agitators.

12. The apparatus of claim 10, wherein the at least one distributor comprises a plurality of rotatable worm screw distributors.

13. The apparatus of claim 10, wherein said apparatus further comprises a conveyor adapted to laterally wrap the conveyor over itself and around a mix of particles of paper and water to envelope and compact the mix during use.

* * * * *